3,132,118
LINEAR POLYCARBONATES FROM BIS (PHENOL) ALKANOIC ACID ESTERS
Richard Butterworth, Manor Township, Lancaster County, and John A. Parker, Lancaster Township, Lancaster County, Pa., assignors to Armstrong Cork Company, Lancaster, Pa., a corporation of Pennsylvania
No Drawing. Filed Apr. 22, 1959, Ser. No. 808,010
6 Claims. (Cl. 260—47)

This invention relates to linear polycarbonates and more particularly to linear polycarbonates having terminal hydroxyl groups. Still more particularly the invention relates to linear polycarbonates having exceptional properties in the molecular weight range of about 20,000–70,000.

Various bis-phenols and phosgene have been used as the starting materials for polycarbonates in the past. However, prior polycarbonates have lacked such desirable features as internal plasticization, the absence of which has brought about crystallization on stretching and casting from solvents. In fact normal wear and tear on prior polycarbonate films have frequently brought about crystallization in the film with the resultant, undesirable, cloudy appearance to the eye.

It is a primary object of the present invention to present an improved linear polycarbonate possessing enhanced optical properties. It is a further object to present a polycarbonate possessing internal plasticization. It is still a further object of the invention to present a linear polycarbonate and the process of making such polycarbonate which will exhibit no cloudiness when prepared and used in the form of a film.

These objects are accomplished in a surprisingly straightforward and effective manner. The invention contemplates forming a linear polycarbonate possessing terminal hydroxyl groups by reacting phosgene at a temperature in the range of 18°–22° C. with a bis (phenol) alkanoic acid ester.

The critical bis (phenol) alkanoic acid ester which forms the starting material of the process of the present invention possesses the formula

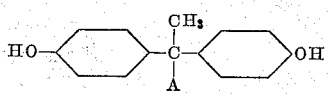

wherein A is a radical selected from the group consisting of —COOR, —CH₂COOR, and —CH₂CH₂COOR, and R is an alkyl group containing 1–18 carbon atoms. These esters are prepared by the reaction of the desired alcohol with the diphenolic acid. The alcohol will be the saturated aliphatic series running from methyl up to and including stearyl alcohols. The diphenolic acid itself is prepared by the condensation of phenol with such materials as levulinic acid, pyruvic acid, and ethyl aceto acetate.

The formation of the bis (phenol) alkanoic acid ester is carried out by admixing the alcohol and the diphenolic acid, preferably with an excess of alcohol, followed by warming the mixture to a temperature generally in the range of 80°–120° C. Agitation should be vigorous during the esterification period. Since the diphenolic acid is possessed of a carboxyl group and two phenolic hydroxyl groups, it is apparent that the diphenolic acid is capable of self-condensation. To prevent this self-condensation, the temperature should be kept within the limits above-stated, and the excess of the alcohol should be used. A solvent or a solvent system may be used as the reaction medium for conducting the esterification. Suitable solvents are, for example, benzene, toluene, xylene, and carbon spirits. Acidic conditions favor the esterification, and catalytic amounts of acids are preferably used during the esterification. As examples of such catalysts there can be mentioned p-toluene sulfonic acid, dry hydrochloric acid, and the like. Esterification is generally complete in a period of 6 to 10 hours, with longer periods being required at lower temperatures. At the end of the esterification, the solvent or solvent system, if any, is removed as by distillation at temperatures of less than 120° C.; vacuum distillation will frequently be used. The resulting bis (phenol) alkanoic acid ester—also called herein the diphenolic acid ester—can be recrystallized or otherwise purified from petroleum ether or other hydrocarbon solvents. It is important that all the alcohol be removed from the ester in order that subsequent polycarbonate formation will not be short-stopped. It is this diphenolic acid ester, having the chemical structure as defined above, that imparts to the final polycarbonate product its unexpectedly desirable properties.

The reaction between phosgene and the above-described diphenolic acid ester is preferably carried out in a solvent or a solvent system. Solvents which are relatively inert to the reactants such as acetone, ether, benzene, or the like, may be employed as the reaction medium. Although a solvent is not essential, use of a solvent or solvent system greatly improves the handleability of the entire reaction. It has been found that the reaction between the phosgene and the diphenolic acid ester is greatly accelerated by the use of a strong base to aid in the elimination of hydrogen chloride from the reactants. Although bases such as sodium hydroxide and potassium hydroxide can be used, it is preferred that organic material such as pyridine, quinoline, and the like be used.

The phosgene and the diphenolic acid ester will be used in equimolar amounts. The diphenolic acid ester is preferably taken up in the solvent and the phosgene bubbled through the solution in the form of a gas. By metering the amount of phosgene admitted to the solution, it is possible to determine when sufficient phosgene has been admitted to the solution on a mole-for-mole basis. No harm is done if a molar excess of phosgene is used, but an excess of the acid ester will reduce the molecular weight due to incomplete reaction.

The temperature of the reaction must be in the range of 15°–35° C., and preferably in the range of 18°–22° C. Temperatures outside of the broader range will produce a polymer having a molecular weight which is too small and which possesses insufficient strength for the purposes intended. Since the reaction is exothermic the problem generally encountered will be to keep the temperature down. This is accomplished by the familiar means of cooling water or cooling liquids to withdraw heat from the reaction mixture.

On completion of the reaction the linear polycarbonate should be recovered from the solvent or solvent system. Any hydrochloric acid salts can be removed from the reaction mixture by filtering. Water can then be used to precipitate the polymer from the solvent; the polymer is in the form of a flock. The molecular weight will be in the range of 20,000–70,000, with higher molecular weight polycarbonates being produced at higher temperatures within the above-specified range. The polycarbonate is soluble in such solvents as the esters, for example ethyl acetate, butyl acetate, and butyl Cellosolve acetate, and tetrahydrofuran, and dimethylformamide. Polycarbonates made from the straight bis-phenols are not soluble in these solvents.

A solvent solution of the linear polycarbonate can be used to deposit a film of the polycarbonate on such surfaces as desk tops, wall covering, floor coverings, and the like. This film is tough, strong and flexible, and will show no whitening or other indications of crystallization on pronounced distortion. Even pronounced stretching produces no crystallization. The linear polycarbonate of the present invention may thus be utilized as the resin in injection molding, with or without fillers. The structural formula of the linear polycarbonate possessing terminal hydroxyl groups is as follows:

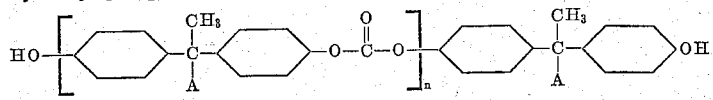

wherein n is a number between 100 and 200, A is selected from the group consisting of —COOR,

—CH₂CH₂COOR, and R is an alkyl group containing from 1–18 carbon atoms. In one modification of the linear polycarbonate n is a number in the range 110–150 inclusive, and more narrowly, 120–130 inclusive.

The above-described linear polycarbonate resins possessing terminal hydroxyl groups may be modified by utilizing as a starting mixture the above-described diphenolic acid ester admixed with a bis-phenol having the general formula

wherein Ar represents arylene and A represents a saturated bivalent aliphatic hydrocarbon radical such as an alkylidene or an alkylene radical containing 1–7 carbon atoms. These bis-phenols have been reacted with phosgene in the past to produce polycarbonates, but they have never been used as modifying agents in combination with the above-described diphenolic acid ester to produce useful polycarbonates. The bis-phenol to be admixed with the diphenolic acid ester can be thought of as a comonomer of the diphenolic acid ester.

The amount of the bis-phenol to be admixed with the diphenolic acid ester to produce the modified polycarbonates of the present invention should be in the range of about 0–95 mole percent of the bis-phenol. To state it another way the diphenolic acid ester must always be present at least in an amount of 5 mole percent of the mixture of phenols. The amount of bis-phenol may thus vary from 95 mole percent on down to zero mole percent wherein a polycarbonate is produced solely from the diphenolic acid ester as described earlier.

Preparation of the polycarbonates from the mixture of bisphenols will be as described earlier for the use of diphenolic acid ester alone.

Linear polycarbonates prepared using the mixture of bis-phenols will possess a structure in which the diphenolic acid ester moiety is interrupted by the bis-phenol moiety to the extent that the bis-phenol is utilized in the starting reaction mixture. The final products are isolated in the usual fashion from the reaction mixture as fine, white powders soluble in such solvents as tetrahydrofuran, dimethylformamide, and methylene chloride.

An interesting feature of these polycarbonates is their ability to cure on the application of heat. The fusible copolymers as prepared may be converted to insoluble and infusible resins possessing excellent heat stability by heating for periods which may vary from 6 hours at 150° C. to 1 hour at 200° C. These self-vulcanizing copolymers from diphenolic acid esters and bis-phenols are particularly well suited for certain kinds of flooring binder applications wherein the copolymers serve as binders for fillers, the entire composition being rendered into sheet form and cured by the application of heat.

The curing process apparently proceeds with elimination of the alcohol corresponding to the alcohol used to form the diphenolic acid ester. If the fusible copolymers are heated in sufficiently thick sections with a sufficiently high concentration of diphenolic acid ester present in the copolymer (for example 50 mole percent or more), and if the alcohol eleased is volatile, a foamed or cellular structure will thereby be formed yielding a rigid, high temperature resistant foam structure having closed cells.

The following examples illustrate several embodiments of the invention. All parts are by weight unless otherwise stated.

*Example 1*

Into a flask equipped with stirrer, thermometer well, reflux condenser, and Dean & Stark trap were placed 152 parts (0.53 mole) 4,4-bis-(4-hydroxyl phenyl) pentanoic acid, 243 parts (3.0 moles) n-butyl alcohol, and 2 parts of p-toluene sulfonic acid. The mixture was slowly heated and at the end of 6½ hours 7½ parts of water was collected while the flask temperature was 123° C. The amount of water produced indicated the reaction had proceeded to 95% of the theoretical.

On cooling most of the excess butyl alcohol was removed with a water aspirator and 250 parts of petroleum ether was added to the residue. The product crystallized. The ester was purified by recrystallization from a warm benzene solution twice. The butyl 4,4-bis-(4-hydroxyl phenyl) pentanate was soluble in ethyl ether, benzene, chloroform, and methyl alcohol. The ester was insoluble in petroleum ether and cyclohexane.

The polycarbonate was prepared from the above-described butyl ester as follows. Into a flask equipped with stirrer, thermometer, and phosgene inlet and outlet tubes were placed 66 parts (0.2 mole) of the above-described butyl ester, 39.3 parts (0.5 mole) pyridine, and 821 parts methylene chloride (CH₂Cl₂). Phosgene was passed into the stirred mixture for 30 minutes while the temperature was maintained between 18°–22° C. by means of an ice bath. At the end of that time the reaction solution was poured into 5% hydrochloric acid in water having a volume approximately that of the reaction mixture. After decanting, the reaction mixture was washed with another equal portion of 5% hydrochloric acid solution in water. The putty-like mass obtained from pouring the washed reaction product into an excess of methyl alcohol was redissolved in methylene chloride, filtered, and precipitated with methyl alcohol in a Waring Blendor. A small portion of the solid was redissolved in methylene chloride and formed into a clear film. The film was clear, tough and strong and had a tensile strength of 410 kilograms per square centimeter and an elongation of 105%. The molecular weight of the polycarbonate was 39,000. Stretching the film to the breaking point produced no signs of crystallization; the film remained clear and water white.

*Example 2*

In a manner similar to that described in Example 1, octyl 4,4-bis-(4-hydroxyl phenyl) pentanate was prepared by heating for 7 hours at a temperature of 98° C. a mixture of 227 parts 4,4-bis-(4-hydroxyl phenyl) pentanoic acid, 260 parts n-octyl alcohol, 2 parts p-toluene sulfonic acid, and 175 parts benzene. At the end of the 7 hours the benzene was stripped off at 120° C. under vacuum from a water aspirator, followed by a distillation at 2–8 mm. of mercury absolute at 140° C. To this distillate was added an excess of petroleum ether which eventually was produced a brown paste.

To prepare the polycarbonate, 57 parts of the above-described octyl ester was phosgenated in 295 parts pyridine. The resulting reaction mixture was poured into a 5% hydrochloric acid solution, and the oil obtained was washed and dissolved in methylene chloride. Methyl alcohol was used to precipitate the polymer from the solution and to wash the polymer thoroughly.

The polymer when redissolved in methylene chloride, and formed into a film, was water white, flexible, and did not crystallize under any conditions of stretching or flexing. The molecular weight was 20,000.

Example 3

Into a flask fitted with gas inlet and outlet, stirrer, and thermometer, were placed 1.5 parts (0.015 mole) methyl 4,4-bis-(4-hydroxyl phenyl) pentanate, 21.6 parts (0.085 mole) 2,2-bis-(4-hydroxyl phenyl) propane, 9 parts sodium hydroxide (0.225 mole), 250 parts water, 410 parts methylene chloride, and 0.9 part dimethyl benzyl stearyl ammonium chloride. Phosgene was passed into the solution for 17 minutes at which time the solution turned acid indicating that all of the bis-phenols had reacted with the phosgene.

The resulting emulsion was dropped into boiling water and the collected solid was ground in a Waring Blendor and washed with additional distilled water. Finally the light, fluffy solid was dried over calcium sulfate under a vacuum. Recrystallization of the solid was accomplished by stirring 13.9 parts of the polycarbonate into 265 parts tetrahydrofuran and 15.7 parts acetic acid. The solution was filtered and the filtrate was poured into 400 parts of water. The putty-like solid was again dried in a vacuum over calcium sulfate. The material was completely soluble in tetrahydrofuran, forming a clear solution. A film made from this solution was water white, tough and strong. On heating at about 200° C. for 5 minutes the film formed a clear, tough, strong film no longer soluble in tetrahydrofuran.

We claim:

1. A high molecular weight resinous polycarbonate of an alkyl ester of 4,4-bis-(4-hydroxyl phenyl) pentanoic acid and carbonic acid.

2. A linear polycarbonate having the formula

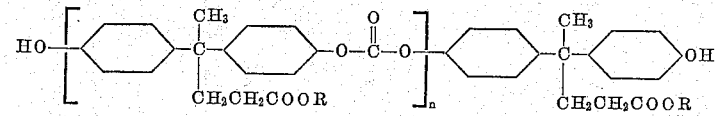

wherein R is an alkyl group containing 1–18 carbon atoms, and $n$ is a number in the range 100–200 inclusive.

3. A polycarbonate according to claim 2 wherein $n$ is a number in the range 110–150 inclusive.

4. A polycarbonate according to claim 2 wherein $n$ is a number in the range 120–130 inclusive.

5. A surface supporting thereon the product of claim 2 in the form of a film.

6. A linear polycarbonate obtained by contacting phosgene at a temperature in the range of 15°–35° C. with a 50:50 mole percent mixture of 4,4-bis-(4-hydroxyl phenyl) pentanoic acid ester wherein the ester group is an alkyl group containing 1–18 carbon atoms and 2,2-bis-(4-hydroxyl phenyl) propane, in the presence of an alkaline catalyst being inert to reaction with phosgene, the amount of said phosgene being at least equimolar to the amount of said ester.

References Cited in the file of this patent

Schnell: Angew. Chemie, 68 (No. 20), 633–640 (1956).

"Diphenolic Acid, a New Chemical Intermediate"; S. C. Johnson and Sons, Inc., Service Products Division, Racine, Wis., published April 1958, page 6 especially relied on.